April 27, 1943.  A. SVOBODA  2,317,418
VARIABLE SPEED TRANSMISSION
Filed March 26, 1942  2 Sheets-Sheet 1

INVENTOR
ANTONIN SVOBODA
BY
Byerly Watson + Simonds
ATTORNEYS

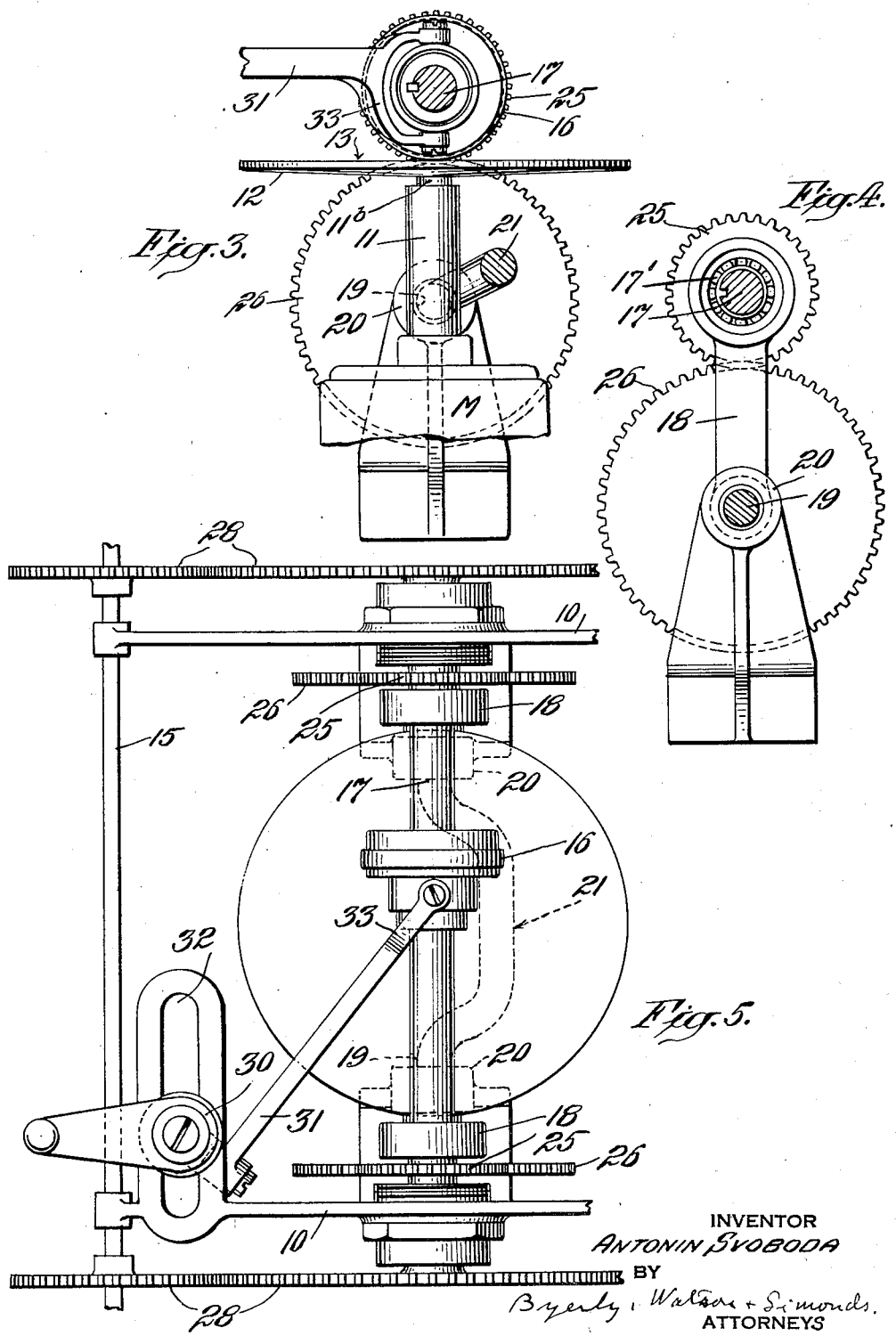

Patented Apr. 27, 1943

2,317,418

UNITED STATES PATENT OFFICE 2,317,418

VARIABLE SPEED TRANSMISSION

Antonin Svoboda, Forest Hills, N. Y., assignor to Abax Corporation, New York, N. Y., a corporation of New York Application March 26, 1942, Serial No. 436,231

6 Claims. (Cl. 74—194)

This invention relates to a variable-speed transmission. The invention provides a friction transmission whose speed ratio may be adjusted by the application of a very slight force notwithstanding the fact that the transmission is capable of transmitting substantial power without slippage.

Friction drives in which a friction wheel is mounted for axial movement across the face of a friction disc have been proposed, and to some extent used, but they have proved impracticable for transmitting any substantial amount of power. This is because changes in speed ratio require sliding the friction wheel laterally over the friction disc, and such lateral sliding is impossible if the wheel and disc are pressed together firmly enough to transmit substantial power without slippage. My invention overcomes this difficulty by providing a speed control rod pivoted to the friction wheel and extending at an oblique angle to its axis and at the same time mounting the friction wheel so that it has some freedom of movement perpendicular to its axis. As hereinafter explained, this arrangement permits shifting the friction wheel laterally without any sliding movement between the wheel and the disc. This and other features of my invention may be understood from a detailed description of a specific transmission embodying the invention which is shown in the accompanying drawings in which:

Fig. 3 is a vertical section on the line 3—3 of Fig. 1;

Fig. 4 is a fragmentary side elevation; and

Fig. 5 is a plan view.

Figure 1:
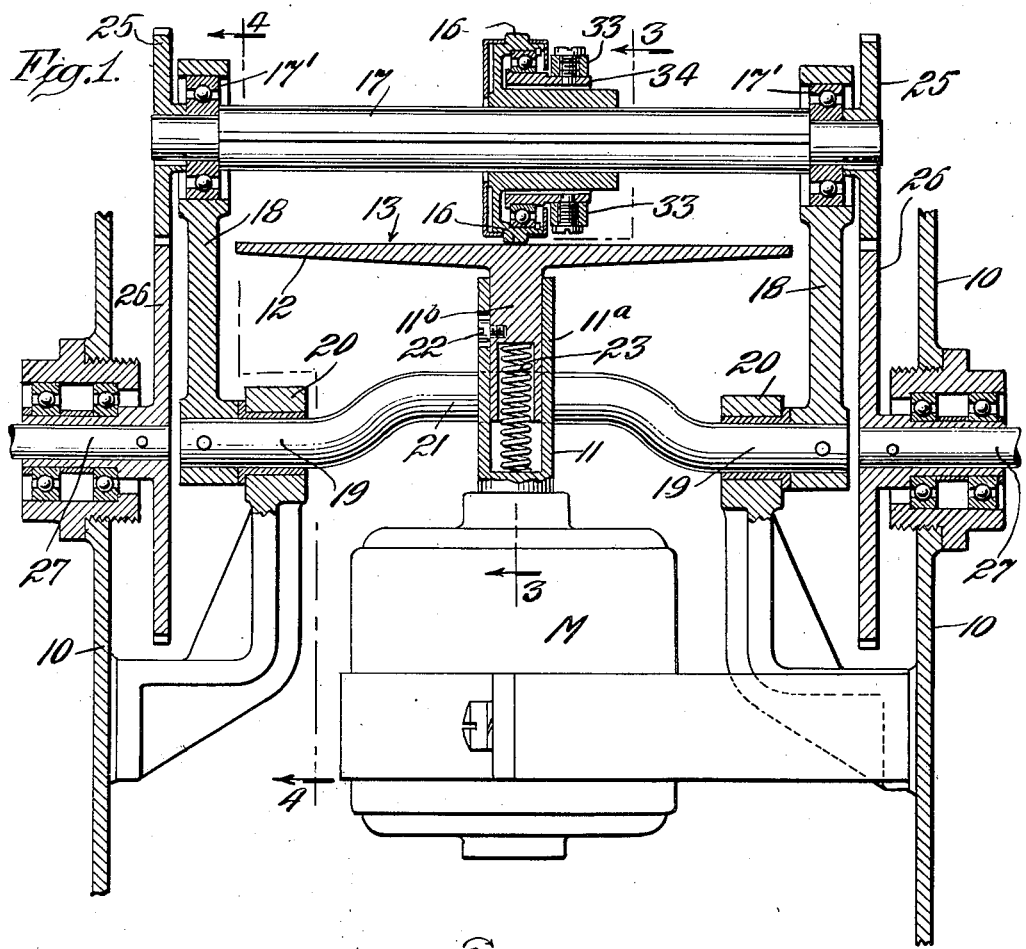
Fig. 1 is an elevation of the transmission partly in axial section and omitting the control rod.

The transmission shown in the drawings has a fixed frame 10 in which is mounted a driving shaft 11 which may be the shaft of a motor M, as shown. At the upper end of the driving shaft 11 is a friction disc 12 having a flat upper face 13.

The driven shaft 15 of the transmission is connected by gearing to a friction wheel 16 which rides on the face 13 of the friction disc 12. The friction wheel 16 is splined on a shaft 17 extending across the face of the friction disc. This mounting leaves the friction wheel 16 free to move in the direction of its axis.

To permit the friction wheel 16 to move perpendicularly to its axis, the shaft 17 is mounted so as to be laterally displaceable from the position over a diameter of the friction disc which it normally occupies. The bearings 17' in which the shaft 17 is mounted are carried by arms 18 fixed on a pivot bar or shaft 19 supported in bearings 20 on the frame. The axis on which the arms 18 are thus pivoted is perpendicular to the axis of the disc 12 and drive shaft 11 and intersects this axis. The pivot bar or shaft 19 contains a bend 21 to permit it to pass around the drive shaft 11 without interfering with it.

The length of the arms 18 is such that small lateral movements of the shaft 17 are accompanied by very slight, and in fact, almost imperceptible, vertical movements of the shaft 17 and wheel 16. To permit such slight vertical movements and also to secure firm traction between the disc and the wheel, the disc 12 is resiliently urged against the wheel. This may be accomplished as shown by making the drive shaft 11 consist of two telescoped parts 11a and 11b which are keyed against relative turning movments by a screw 22 and urged apart by a compression spring 23.

It will be seen that the mounting of the shaft 17 which has been described is such that movements of the friction wheel 16 perpendicularly to its axis are not exactly in a straight line but rather in an arc. Two advantages arise from this. Movements of the friction wheel perpendicularly to its axis away from the diameter of the friction disc increase the tension on the spring 23 which thus tends to restore the friction wheel to its original position. Furthermore, the arcuate movement facilitates providing in the driving connection from the friction wheel 16 means for compensating for movements of the wheel perpendicular to its axis.

The compensating means in the drive from the friction wheel 16 includes pinions 25 and gears 26. The pinions 25 are mounted on the ends of shaft 17 and mesh with gears 26 mounted on shafts 27 whose axes are coincident with the pivotal axis of the arms 18. The shafts 27 are connected to the shaft 15 by gears 28. The pitch diameter of the pinions 25 is the same as the tread diameter of the friction wheel 16 so that the turning of the wheel 16 caused by lateral movement of the shaft 17 does not cause turning of the gears 26. Furthermore, the reaction between the tread of the wheel 16 and the face of the friction disc is exactly counterbalanced by the reaction between the pinions 25 and the gears 26 so that the connection between the wheel 16 and the driven shaft does not introduce any force tending to prevent movement of the wheel 16 in a direction perpendicular to its axis. The same counterbalancing will occur if a single pinion 25 and a single gear 26 are used, so that the arrangement of the pinions and gears in pairs as shown is not essential.

The control mechanism of the drive includes a slide 30 and a rigid element or rod connecting this slide with the friction wheel 16. In the form shown, the slide 30 engages a slot 32 in the frame 10. This slot is parallel to the shaft 17, but is laterally displaced from it. The rod 31 is pivoted to the slide 30 at one end and at its other end has a fork 33 pivoted to a ring 34 rotatably mounted on the friction wheel 16.

Figure 2:
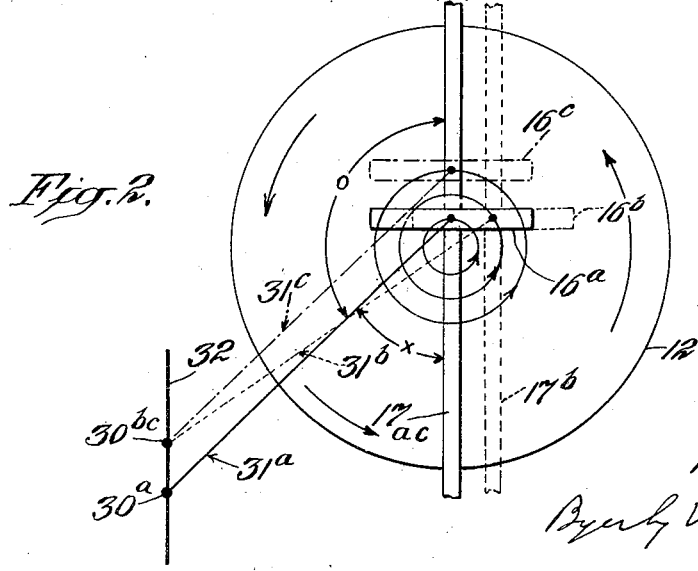
Fig. 2 is a diagrammatic plan view showing different positions of the parts.

The operation of the device may easily be understood from Fig. 2 which shows three positions, a, b and c, of the parts which occur when a change of speed is made. In position a, the shaft 17 extends diametrically across the friction disc 12 and the friction wheel 16 is located with its traction point at a short distance from the center of the disc so that its speed of rotation is relatively slow. To increase the speed ratio, the slide 30 is moved along the slot 32 from the point 30a to the point 30bc. As there is substantially no resistance to movement of the friction wheel 16 perpendicular to its axis, this movement of the slide results in rolling the wheel to the position shown at 16b, rod 31 taking the position shown at 31b. As the tread line of the wheel is at an angle to the movement of the part of the disc in contact with it when the wheel is at position 16b, the relative movement of the wheel and disc is in a spiral and the wheel moves automatically until its tread again lies parallel to the movement of the part of the disc in contact with it. This condition occurs when the wheel reaches the position 16c which brings the shaft 17 back to its original position, and the rod 31 to the position of 31c. It will be seen that in this position the traction point of the wheel is at a greater distance from the center of the friction disc than in its original position 16a so that the speed of the wheel is increased. It will be noted also that the wheel has been brought from the position 16a to the position 16c without any lateral sliding movement over the face of the disc.

In the explanation given in connection with the diagrammatic drawing, it was assumed that the movement of the controlling slide 30 from the position 30a and the position 30bc was instantaneous. In actual practice, a finite time is of course required for moving the slide, so that the spiraling movement of the wheel starts as soon as the lateral displacement of the shaft 17 starts. As a result, even on quick movements of the controlling slide, the shaft 17 is displaced sidewise only to a small extent.

It will be seen by examination of Fig. 2 that the final position 16c of the wheel is displaced from its original position 16a by a distance equal to the distance through which the slide 30 has been moved, so that each position of the slide produces a definite speed ratio. The movement of the slide from 30a to 30bc requires a very slight force as there is substantially no resistance to lateral displacement of the shaft 17, while, on the other hand, direct movement of the friction wheel from the position 16a to the position 16c would require an impossibly great force.

It also appears from Fig. 2 that the ease of movement of the controlling element results from the fact that the wheel is mounted for easy displacement perpendicular to its axis and the fact that the rod 31 is pivoted to the wheel and extends at an oblique angle to the axis of the wheel.

By this I mean that a straight line connecting the pivots at the two ends of the rod makes an obtuse angle o and an acute angle x with the wheel shaft 17. As shown by the arrows in Fig. 2, the direction of rotation of the disc 12 is such that the surface of the disc moves across the obtuse angle o from the shaft 17 to the rod 31 and across the acute angle x from the rod 31 to the shaft 17.

It is not essential that movement of the slide 32 be parallel to the shaft 17, although this is usually the most convenient arrangement since it permits having the rod 31 at an angle of 45° to the axis of the wheel after each change in speed has been effected.

What I claim is:

1. In a variable-speed transmission comprising a friction disc and a friction wheel having its periphery in contact with the face of the disc, a mounting for the friction wheel permitting free movement thereof along its axis and perpendicular to its axis comprising a shaft for the friction wheel extending across the face of the friction disc, a spline connection between said shaft and the friction wheel, a support for the said shaft pivoted on an axis behind the face of the friction disc and intersecting the axis of the friction disc, and resilient means permitting a slight separating movement between said shaft and the friction disc in the direction of the axis of the friction disc.

2. In a variable-speed transmission comprising a friction disc and friction wheel having its periphery in contact with the face of the disc, the combination of a mounting for the friction disc permitting free movement thereof along its axis and perpendicular to its axis and consisting of a shaft for the friction wheel extending across the face of the friction disc, a spline connection between the wheel and the shaft, a support for the shaft pivoted on an axis behind the face of the friction disc and intersecting the axis of the friction disc at right angles, and resilient means permitting a slight separating movement between said shaft and the friction disc; and a driving connection from the friction wheel arranged to compensate for movements of the wheel perpendicular to its axis and consisting of a pinion on said shaft having a pitch diameter equal to the diameter of the friction wheel, and a gear engaging said pinion and mounted to turn about the axis on which the support for the shaft is pivoted.

3. A variable-speed transmission comprising a friction disc, a shaft extending across the face of the friction disc, a pair of arms pivoted on an axis behind the face of the friction disc and intersecting the axis of the friction disc, bearings for said shaft carried by said arms, a friction wheel splined on said shaft and having its periphery in contact with the face of the friction disc, resilient means urging the friction disc toward said shaft to press it against the periphery of said wheel, a pinion on said shaft having a pitch diameter equal to the diameter of the friction wheel, a gear engaging said pinion and mounted to turn about the axis on which said arms are pivoted, and a speed-controlling mechanism comprising a slide spaced laterally from said shaft and movable parallel to said shaft and a rigid member connecting said slide and the friction wheel and extending at an oblique angle to said shaft.

4. A variable-speed transmission comprising the combination with a driving shaft and a driven shaft of a friction disc splined on the driving shaft at one of the ends of the shaft, resilient means urging the friction disc outwardly along the driving shaft, a wheel shaft extending across the face of the friction disc, a pair of arms pivoted on an axis behind the face of the friction disc and intersecting the axis of the friction disc at right angles, bearings for the wheel shaft carried by said arms, a friction wheel splined on the wheel shaft and having its periphery in contact with the face of the friction disc, a pinion on the wheel shaft having a pitch diameter equal to the diameter of the friction wheel, a gear engaging said pinion and mounted to turn about the axis on which said arms are pivoted, a gear connection between said gear and the driven shaft, and speed-controlling mechanism comprising a slide spaced laterally from the wheel shaft and movable parallel to said shaft, a ring rotatably mounted on the friction wheel, and a rigid member having its ends pivoted to the ring and to the slide and greater in length than the distance between the line of movement of the slide and the axis of the wheel so that it lies at an oblique angle to the axis of the wheel.

5. A variable-speed transmission comprising a friction disc, a friction wheel having its periphery in contact with the face of the friction disc and mounted for free movement along its axis and perpendicular to its axis, and speed control rod pivoted to the friction wheel and extending at an obtuse angle to the axis of the wheel, and means for rotating the friction disc in such direction that it moves across said obtuse angle from the wheel axis to the rod.

6. In a variable-speed transmission comprising a friction disc and a friction wheel having its periphery in contact with the face of the friction disc, a mounting for the friction wheel permitting free movement thereof along its axis and free movement of the axis of the wheel in a cylindrical surface whose axis intersects the axis of the friction disc.

ANTONIN SVOBODA.